(12) United States Patent
Urch

(10) Patent No.: US 6,829,900 B2
(45) Date of Patent: Dec. 14, 2004

(54) HEAT EXCHANGER

(75) Inventor: John Francis Urch, Cronulla (AU)

(73) Assignee: Air-Change Pty Limited, Caringbah (AU)

( * ) Notice: Subject to any disclaimer, the term of this patent is extended or adjusted under 35 U.S.C. 154(b) by 163 days.

(21) Appl. No.: 10/069,435

(22) PCT Filed: Mar. 14, 2001

(86) PCT No.: PCT/AU01/00273

§ 371 (c)(1),
(2), (4) Date: Feb. 20, 2002

(87) PCT Pub. No.: WO01/69154

PCT Pub. Date: Sep. 20, 2001

(65) Prior Publication Data

US 2002/0134087 A1 Sep. 26, 2002

(30) Foreign Application Priority Data

| Mar. 14, 2000 | (AU) | ............................................... | PQ6199 |
| Jul. 27, 2000 | (AU) | ............................................... | PQ9019 |
| Aug. 3, 2000 | (AU) | ............................................... | PQ9181 |
| Dec. 12, 2000 | (AU) | ............................................... | PR1925 |

(51) Int. Cl.[7] .............................................. F25B 21/02
(52) U.S. Cl. ............................ 62/3.2; 62/271; 165/166
(58) Field of Search .......................... 62/3.2, 271, 427; 165/1, 165, 166

(56) References Cited

U.S. PATENT DOCUMENTS

| 4,244,422 A | 1/1981 | Hallgren |
| 4,823,867 A | 4/1989 | Pollard et al. |
| 5,078,208 A | 1/1992 | Urch |
| 5,829,513 A * | 11/1998 | Urch ............................ 165/54 |
| 5,876,679 A * | 3/1999 | D'Acierno et al. .......... 422/143 |
| 6,434,963 B1 * | 8/2002 | Urch ............................ 62/279 |

FOREIGN PATENT DOCUMENTS

| EP | 404259 B1 | 12/1990 |
| GB | 1 498 621 | 1/1978 |
| JP | 10-089878 | 4/1998 |
| WO | WO 93/18360 | 9/1993 |

* cited by examiner

Primary Examiner—Melvin Jones
(74) Attorney, Agent, or Firm—Traskbritt

(57) ABSTRACT

A gas-flow heat exchanger comprising a set of parallel, spaced, heat-conductive areas providing between them a stack of pockets each containing parallel baffles which define a platen of passageways guiding the gas-flow path through the pocket between inlet and outlet openings. The openings being arranged in four parallel lines at the sides of the stack, two of the lines respectively containing the inlet and outlet openings associated with the gas flow paths of alternative pockets. The remaining two lines respectively containing the inlet and outlet openings associated with the remaining pockets. Each pocket containing a removable frame formed with the openings provided at the ends of the gas flow path through it and supporting within the frame the parallel baffles which divide the gas-flow path into the platen of passageways. All of the passageways provide a substantially equal dwell time to gas passing therethrough.

43 Claims, 13 Drawing Sheets

HEAT EXCHANGER

TECHNICAL FIELD

This invention relates to a heat exchanger for transferring heat between two gas-flow paths, and more particularly concerned with a substantially counterflow isolating heat exchanger having separate primary and secondary gas flow circuits between which there are good heat transfer properties. The invention is particularly suitable for use in air-conditioning and ventilation systems.

BACKGROUND

Air flow isolating heat exchangers are becoming increasingly important to reduce the cost of heating or cooling of an outdoor air supply fed into an enclosed space such as a building. Such heat exchangers are required to handle air flows for small and large spaces from 50 1/s to 10,000 1/s of outdoor air, ideally transferring the sensible and latent heat from the stale exhaust air of the room.

The conventional form of heat exchanger for use with gases is the parallel plate heat exchanger. This comprises a stack of spaced parallel thermal conductive plates, which define between them, pockets through which the gas flows. Alternate pockets are connected to carry one of the two gas streams between which heat is to be transferred, and the remaining pockets carry the other gas stream. Gas has a lower heat content than liquid. This has led to the development of heat exchangers in which the gas-flow paths have a large cross-sectional area, using thin materials which are preferred because the transfer of heat from a gas to a surface along which it is traveling takes place more slowly than is the case with a liquid which wets the surface.

In order to extend the "dwell time" of the gases in the heat exchanger, it has been proposed to provide thin, substantially parallel baffles in the pockets which extend the length of the gas flow path through them and are in good thermal contact with the plates. Such an arrangement is disclosed in the U.S. Pat. No. 5,829,513 (Urch). This patent discloses the feature of providing a sinuously wound thermal conductive membrane with a stack of parallel pockets each of which contain a molded plastic skeletal insert. The insert comprises a flat frame supported within it a set of parallel baffles which define a platen of passageways, extending between the inlet and outlet openings which is provided in the frame.

Whilst the heat exchanger disclosed in U.S. Pat. No. 5,829,513 has a number of advantages, it also has a number of disadvantages. Firstly, gas traveling through a particular passageway in the heat exchanger spends a different "dwell time" to that of gas passing through an adjacent passageway in the same pocket. Whilst each of the passageways are of substantially the same width, as shown in FIG. 3 of U.S. Pat. No. 5,829,513, they are nested in a U-shape, such that the outer passageways are longer than the inner passageways. This means gas entering an inner passageway travels through it quicker than gas passing through an outer passageway. The "dwell time" is the period the gas spends within the passageway. The dwell time for gas passing through an outer, longer passageway is longer than that of the dwell time for gas passing through an inner, shorter passageway. These differences in dwell times affect the overall efficiency of the heat exchanger. Another disadvantage with the heat exchanger disclosed in U.S. Pat. No. 5,829,513 is that it has a high pressure drop and therefore requires substantial fan power to urge gas therethrough.

The present invention provides an improved heat exchanger for transferring heat between two separate gas-flow paths.

SUMMARY OF INVENTION

In accordance with a first aspect, the present invention consists in a gas-flow heat exchanger comprising a set of parallel, spaced, heat-conductive areas providing between them a stack of pockets each containing parallel baffles which define a platen of passageways guiding the gas-flow path through the pocket between inlet and outlet openings, the openings being arranged in four parallel lines at the sides of the stack, two of the lines respectively containing the inlet and outlet openings associated with the gas-flow paths of alternative pockets of the stack, while the remaining two lines respectively contain the inlet and outlet openings associated with the remaining pockets of the stack of the heat exchanger, each pocket containing a removable frame formed with the openings provided at the ends of the gas flow path through it and supporting within the frame the parallel baffles which divide the gas-flow path into the platen of passageways, characterized in that all of the passageways provide a substantially equal dwell time to gas passing therethrough.

In one embodiment each of the passageways has a substantially equal length. Preferably the baffles define a substantially S or Z- shaped platen of passageways. Preferably the platen of passageways of one of the pockets is the mirror image of the platen of passageways of an adjacent pocket to provide crossover counterflow. Preferably the inlet of each passageway is on an opposite side of the stack to that of its outlet.

In another embodiment each platen of passageways is a nest of substantially U-shaped passageways. The length of one of the U-shaped passageways is greater in length than that of an adjacent U-shaped passageway inwardly nested thereto. Preferably the inlet opening and outlet opening of one of the U-shaped passageways is larger in size to the inlet opening and outlet opening of an adjacent U-shaped passageway inwardly nested thereto. Preferably each successive U-shaped passageway has a larger inlet and outlet opening than a passageway inwardly nested thereto.

Preferably each of the pockets contains an identical structure of frame and baffles, differently oriented so that the opening associated with alternative pockets lie in two lines, and the openings associated with the remaining pockets lie in two different lines. Preferably the parallel heat-conductive areas separating the pockets from one another are formed from spaced rectangular or square areas of a sinuously wound heat conductive material.

Preferably the heat conductive material is selected from the group consisting of a metal foil and thin plastic foil. Preferably the heat conductive material is a moisture permeable material that can transfer both sensible heat and latent heat.

Preferably in one embodiment the moisture permeable material is paper. Preferably the paper has a high water strength texture. Preferably the paper is kraft paper. Preferably the kraft paper weighs about 45 grains per square meter.

Preferably in another embodiment the moisture permeable material is a finely woven plastic material.

Preferably the combination of frame and baffles is provided by a skeletal structure. Preferably the skeletal structure is plastic.

An air conditioning system utilizing a gas-flow heat exchanger in accordance with the first aspect of the invention as abovementioned, wherein an air supply fan is in fluid communication with one of the lines containing inlet openings at the side of the stack to deliver air thereto, and an exhaust fan is in fluid communication with another of the lines containing inlet openings at the side of the stack to deliver exhaust air from the space being air-conditioned.

In one arrangement the supply fan and the exhaust fan are adjacent to each other on the same side of the stack.

In another arrangement the supply fan and the exhaust fan are on opposite sides of the stack.

An air conditioning system utilizing a gas-flow heat exchanger in accordance with the first aspect of the invention as abovementioned, wherein air having entered the gas-flow heat exchanger through the action of the air supply fan, leaves the gas-flow heat exchanger and passes through an evaporator coil prior to entering a delivery conduit for delivery to the space being air-conditioned. Preferably the evaporator coil is selected from the group consisting of a chilled water coil, a vapor compression evaporator and a hot water coil. Preferably exhaust air having entered the gas-flow heat exchanger through action of the exhaust fan, leaves the gas-flow heat exchanger and passes through an evaporator pad where it is cooled by water to almost wet bulb temperature.

An air conditioning system utilizing a gas-flow heat exchanger in accordance with the first aspect of the invention as abovementioned, wherein a thermoelectric panel is placed in fluid communication with the lines containing outlet openings at the side of the stack, with a first portion of the thermo-electric panel in fluid communication with one of the lines containing outlet openings at the side of the stack associated with gas-flow paths of alternate pockets of the stack, and a second portion of the thermo-electric panel is in fluid communication with one of the lines containing outlet openings at the side of the stack associated with gas-flow paths of the remaining pockets of the stack, and a control module is disposed between the first and second portions of the thermo-electric panel. Preferably the thermoelectric panel comprises hot and cold finned heat sinks.

Preferably the application of a DC voltage to the control module induces a heating mode or a cooling mode to the air conditioning system depending on the polarity of the voltage.

An air conditioning system utilizing a gas-flow heat exchanger in accordance with the first aspect of the invention as abovementioned, wherein a water-jacket assembly is placed in fluid communication with the lines containing outlet openings at the side of the stack, with a first portion of the water jacket assembly comprising a first water coil fluidly connected to a first water jacket and a first pump and the first water coil adjacent with one of the lines containing outlet openings at the side of the stack associated with gas-flow paths of alternate pockets of the stack, and with a second portion of the water jacket assembly comprising a second water coil fluidly connected to a second water jacket and a second pump and the second water coil adjacent with one of the lines containing outlet openings at the side of the stack associated with gas-flow paths of the remaining pockets of the stack, and a control module is disposed between the first and second water jackets.

In an alternative arrangement, one of the first and second portions of the water jacket assembly is replaced by a set of air cooled fins adjacent to the control module.

A storage ventilator system for a cold room utilizing a gas-flow heat exchanger in accordance with the first aspect of invention as abovementioned, wherein fresh air entering the cold room passes through a first fan in fluid communication with one of the lines containing inlet openings at the side of the stack associated with gas-flow paths of alternate pockets of the stack, and exhaust air leaving the cold room passes through a second fan in fluid communication with one of the lines containing outlet openings at the side of the stack associated with gas-flow paths of the remaining pockets of the stack.

Preferably the first fan produces the same or slightly greater air volume across it as the second fan, thereby maintaining the air pressure within the cold room at substantially the same level or slightly greater as the outside air. Preferably the first and second fans are impeller fans.

In accordance with a second aspect, the present invention consists in a gas-flow heat exchanger comprising a set of parallel, spaced, heat-conductive areas providing between them a stack of pockets each containing parallel baffles which define a platen of passageways guiding the gas-flow path through the pocket between inlet and outlet openings, the openings being-arranged in four parallel lines at the sides of the stack, two of the lines respectively containing the inlet and outlet openings associated with the gas flow paths of alternative pockets of the stack, while the remaining two lines respectively containing the inlet and outlet openings associated with the remaining pockets of the stack of the heat exchanger, each pocket containing a removable frame formed with the openings provided at the ends of the gas flow path through it and supporting within the frame the parallel baffles which divide the gas-flow path into the platen of passageways, wherein the parallel heat-conductive areas separating the pockets from one another is formed from spaced rectangular or square areas of a sinuously wound heat conductive material characterized in that the heat conductive material is a moisture permeable material that can transfer both sensible heat and latent heat.

Preferably in one embodiment the moisture permeable material is paper. Preferably the paper has a high water strength texture. Preferably the paper is kraft paper. Preferably the kraft paper weighs about 45 grams per square meter.

Preferably in another embodiment the moisture permeable material is a finely woven plastic material.

BRIEF DESCRIPTION OF THE DRAWINGS

The invention will now be described in more detail, by way of examples, with reference to drawings in which.

MODE OF CARRYING OUT INVENTION

Figure 3:
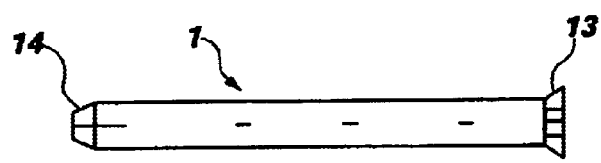
FIG. 3 is a section through I—I of the removable frame shown in FIG. 1.

In a first embodiment, the present invention as shown in FIGS. 1–5 is a gas-flow heat exchanger stack, contained within a closed casing 17. In a manner similar to that disclosed in U.S. Pat. No. 5,829,513 the gas-flow heat exchanger comprises a set of parallel, spaced, heat conductive areas providing between them a stack of pockets 16 each containing baffles 4 which define a platen of passageways 6 guiding the gas-flow path through the pocket between the inlet and outlet openings 2, 3.

Figure 1:
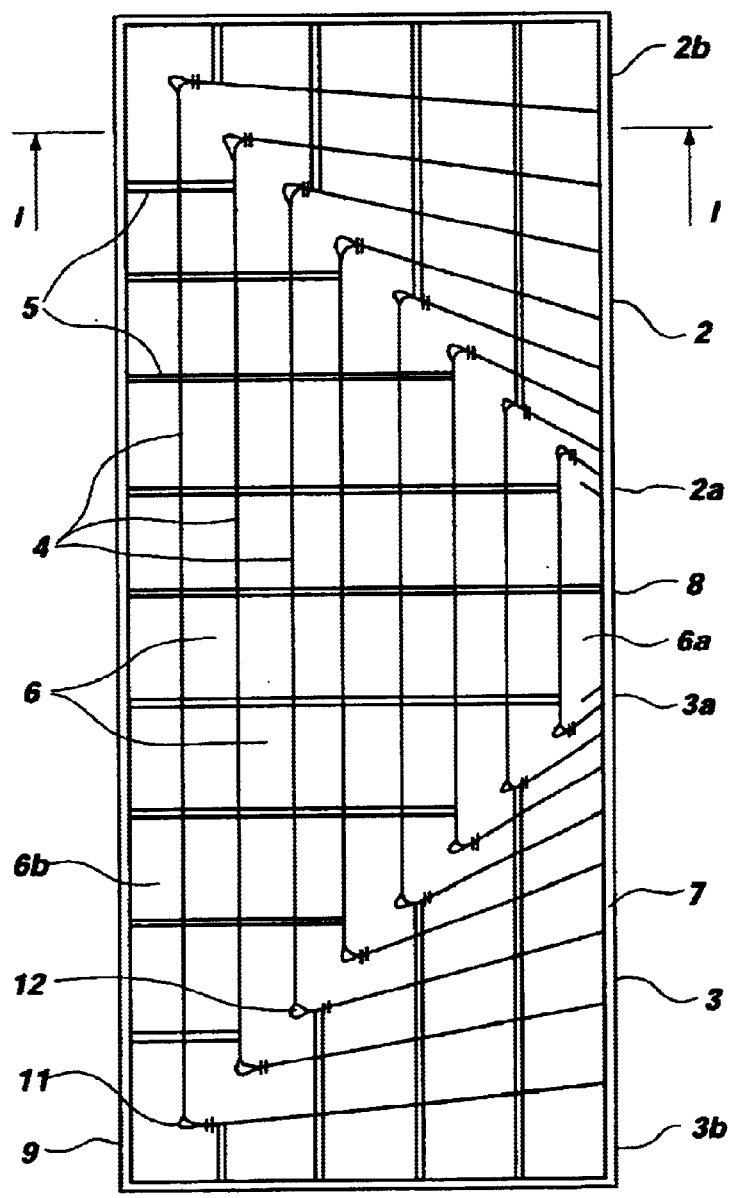
FIG. 1 is a plan view of a first embodiment of a removable frame having baffles defining the platen of passageways of a heat exchanger in accordance with the present invention.
Figure 2:
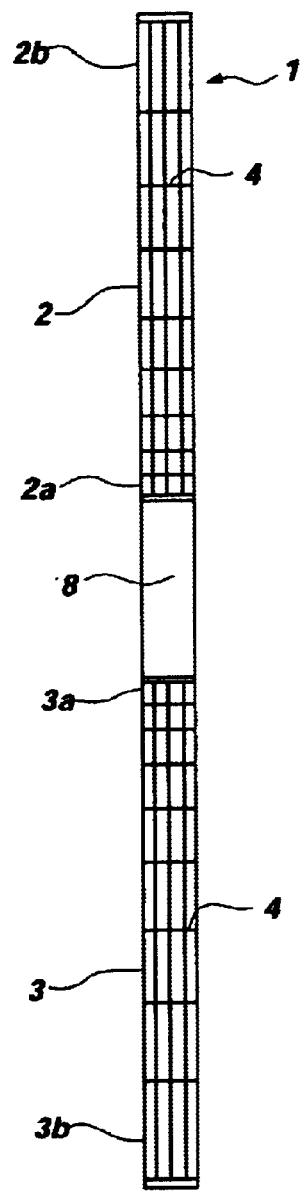
FIG. 2 is an end view of the removable frame of the heat exchanger shown in FIG. 1.

Each pocket contains a removable frame 1 as shown in FIG. 1, which has inlet openings 2 and outlet openings 3 at each end of the gas-flow path. Frame 1 has a multiple set of thin guiding strips (baffles) 4 which together define a plurality of nested substantially U-shaped passageways 6 extending between inlet openings 2 on the upper side of the frame, and the outlet openings 3 on the lower side of frame 1. Webs 5 are of thin rectangular cross section and extend edgewise across frame 1 to act as turbulent triggers to enhance the performance and to support the guiding strips 4. Thin web 7 extends edgeways across the inlet openings 2 and outlet openings 3 to support guiding strips 4 at the opening edges. The middle strip 8 is disposed between the inlet openings 2 and outlet openings 3. Solid edge strip 9 supports the frame on three sides and gives support for webs 5.

Each of inlet openings 2 associated with respective passageways 6 vary in size. The smallest size inlet opening 2a is on the innermost nested U-shaped passageway 6a. The largest size inlet opening 2b is on the outermost nested U-shaped passageway 6b. The size of inlet openings 2, progressively increase in size for each passageway 6 moving outwardly from passageway 6a to passageway 6b. In a similar fashion, the smallest size outlet opening 3a is on the innermost nested U-shaped passageway 6a, and the largest size outlet opening 3b is on the outermost nested U-shaped passageway 6b. The size of outlet openings 3, progressively increase in size for each passageway 6 moving outwardly from passageway 6a to passageway 6b. By varying the sizes of the inlet and outlet openings 2, 3 as shown in FIG. 1, the pressure and flow of gas passing through each passageway is controlled, to be approximately equal and have the same "dwell time."

The extending knobs 11 at the turning areas of each passageway, although not essential, may preferably allow the gas to slow down and use more area of the corner. The rebates (or holes) 12 are used to drain any water that condenses in the frame 1. The tapered sections 13 and 14 are used to increase the area of the openings, and to allow the free entry of the incoming gas at inlet openings 2.

Figure 4:
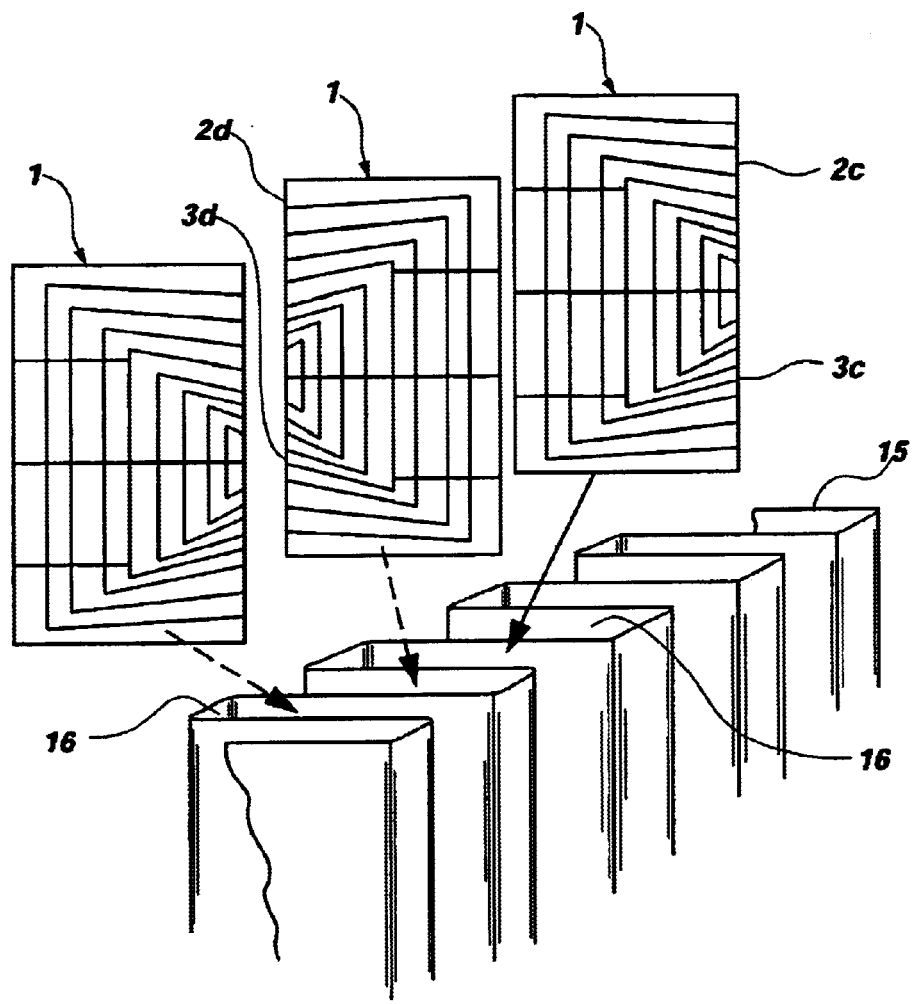
FIG. 4 is a perspective and exploded view of part of a heat exchanger using the removable frame shown in FIG. 1.

FIG. 4 shows sinuously wound foil 15 providing a series of parallel pockets 16. The foil can be made from thin aluminum foil or thin thermal conductive plastic. However, it is more preferable to utilize a moisture permeable material for foil 15, such as fine woven plastic materials or paper with a high water strength texture that can transfer both sensible and latent heat.

One suitable type of paper is kraft paper weighing about 45 grams per square meter. This paper has good heat transfer properties, whilst having sufficient strength for handling. Heavier kraft paper, weighing say 65 gram per square metre may be used, however its heat transfer properties are not as good as that of the paper of lower weight. Whilst kraft paper weighing less 45 grams per square metre and having better heat transfer properties may be used, it suffers from being fragile and difficult to handle during construction of the heat exchanger.

Alternatively, foil 15 may be a finely woven thin polyester material such as that marketed under the trade mark TYDEK by Dupont.

As shown in FIG. 4, the heat exchanger is made up of a plurality of frames 1 each of which is contained in a respective pocket 16. The inlet and outlet openings 2 and 3 of frame 1 are turned through 180 degrees for alternate pockets 16 to allow the flow of gas to both sides of the stack, where the primary gas is on one side with inlet openings 2c and outlet openings 3c and the secondary gas inlet openings 2d and outlet openings 3d in the opposite side of the stack. The frames 1 are preferably made of a plastic molded material that is tough, stiffly resilient and inert. A suitable material is a polypropylene compound.

Figure 5:
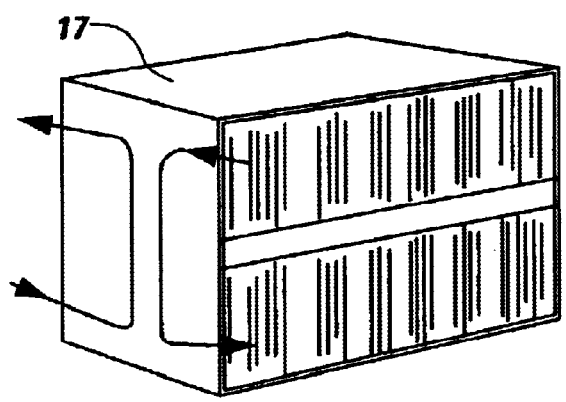
FIG. 5 shows an assembled heat exchanger of the type shown in FIG. 4 with casing and air flow directions.

FIG. 5 shows the heat exchanger stack assembled, showing a surrounding casing 17 and air paths.

Figure 8:
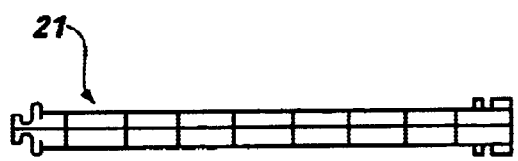
FIG. 8 is a section through VI—VI of the removable frame shown in FIG. 6.
Figure 6:
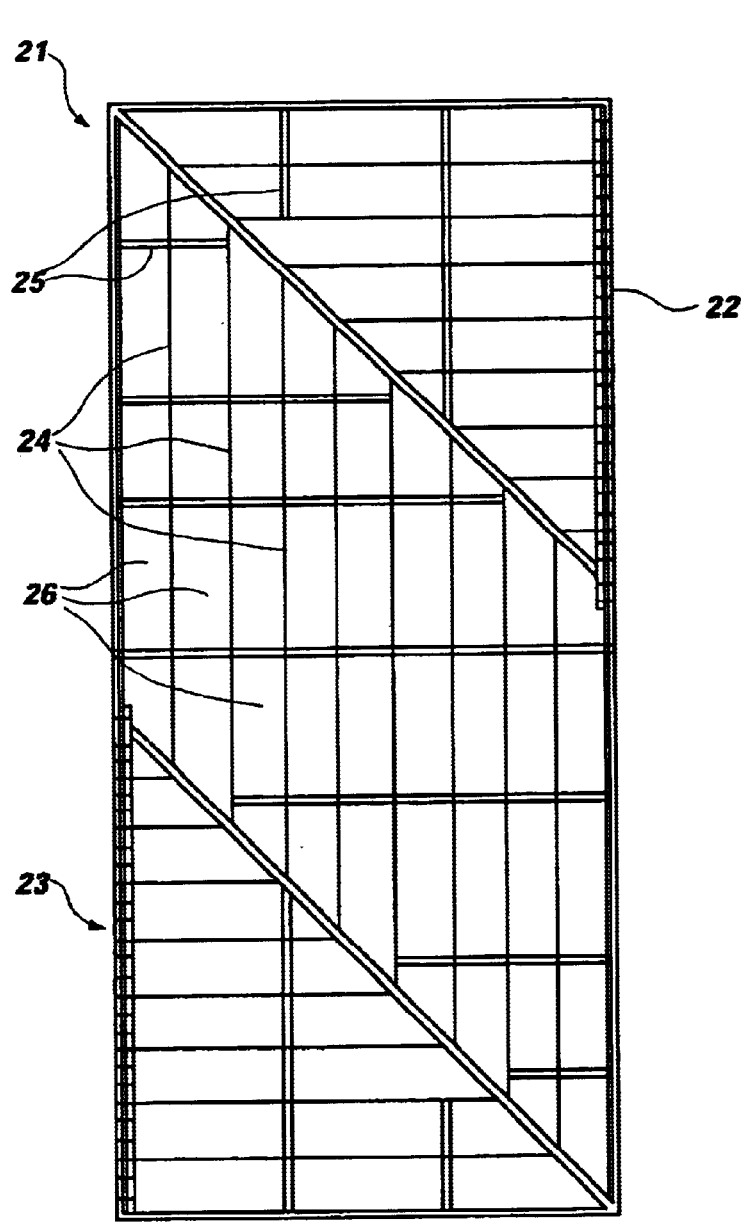
FIG. 6 is a plan view of a second embodiment of a removable frame having baffles defining the platen of passageways of a heat exchanger in accordance with the present invention.
Figure 7:
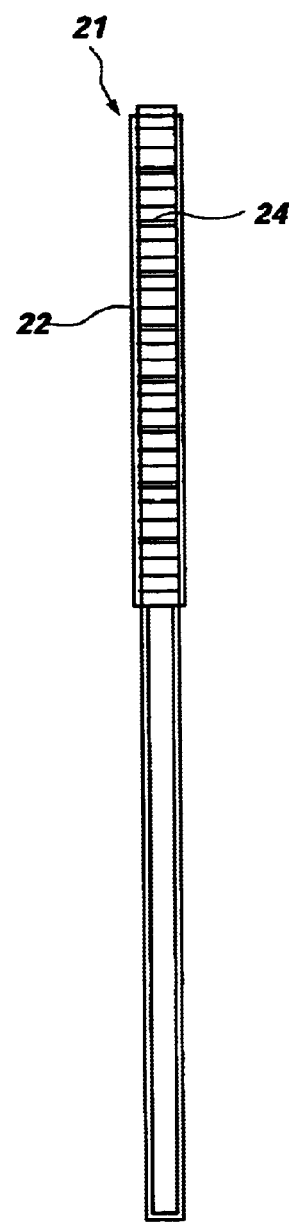
FIG. 7 is an end view of the removable frame of the heat exchanger shown in FIG. 6.

FIGS. 6–8 show a second embodiment of a heat exchanger which is substantially counterflow in operation. In the first embodiment inlet and outlet openings 2, 3 are on the same side of frame 1. In this embodiment, the inlet openings 22 and outlet openings 23 are on diagonally opposite sides of frame 21. Frame 21 has within it a set of parallel baffles(thin guiding strips) 24 which define a platen of passageways 26 extending between inlet and outlet openings 22, 23 provided in the frame 21. The webs 25 lie in the medial plane of the frame 21 and support the baffles 24. In this embodiment the length and width of each passageway 26 is substantially equal. This configuration, in which the passageways are substantially S or Z-shaped ensures that the pressure and flow of gas passing through each passageway is controlled, to be approximately equal and have the same "dwell time."

Figure 9:
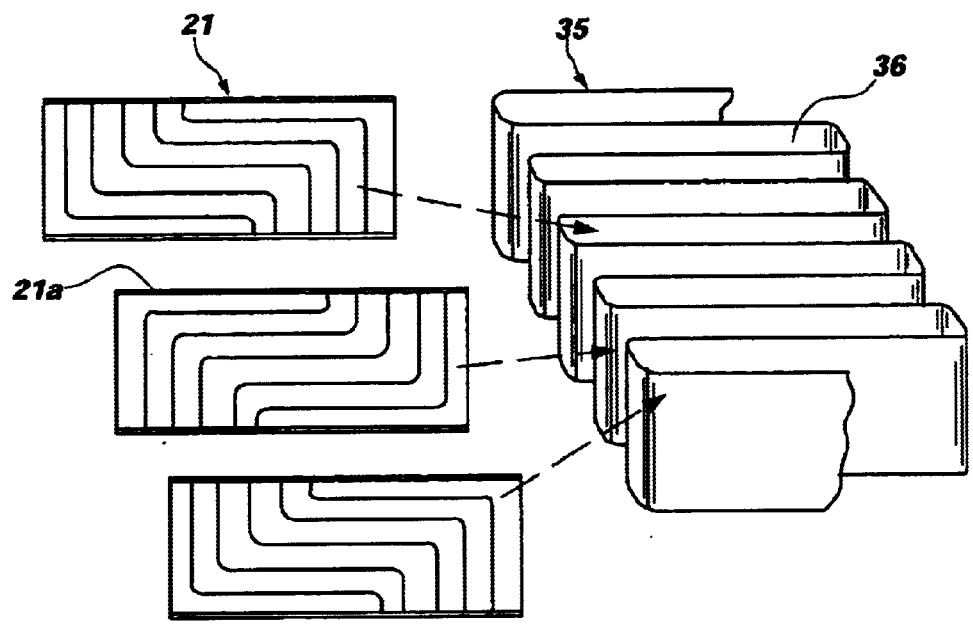
FIG. 9 is a perspective and exploded view of part of a heat exchanger using the removable frame shown in FIG. 6.

FIG. 9 shows a perspective and exploded schematic view off part of the gas exchanger of the second embodiment. The sinuously wound foil 35 is similar in configuration and material to foil 15 of the first embodiment. The heat exchanger is made up of a plurality of frames 21 each of which is contained in a respective pocket 36. The frame 21 is inserted into each of the pockets where every alternative frame 21 is inverted 180 degrees, allowing the inlet 22 in one pocket on top and having the outlet 23 of the inverted frame 21a of the alternate pocket on the bottom of the stack but having the same side as per drawing FIG. 9.

An advantage of a heat exchanger in accordance with the second embodiment shown in FIGS. 6–9, is that a number of such heat exchangers may be assembled in series (side by side) to form a larger heat exchanger assembly, by aligning the line of outlets 23 of one heat exchanger with the line of inlets 22 of an adjacent heat exchanger and so on. This allows for even greater heat exchange efficiency between the primary and secondary gas flow circuits.

Figure 10:
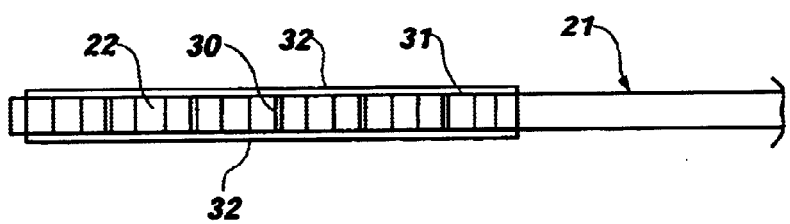
FIG. 10 is an enlarged partial side view of the frame of FIG. 6 showing construction of the inlet openings.
Figure 11:
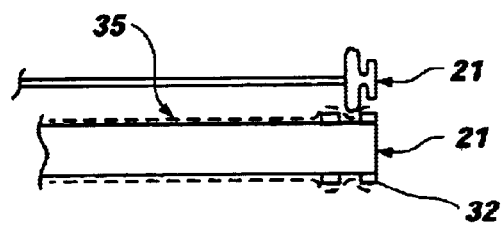
FIG. 11 is a schematic of the end detail of two frames and foil trapped there between where they are connected.
Figure 12:
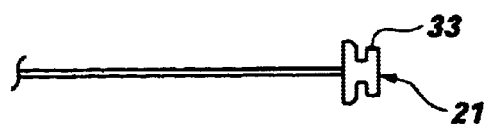
FIG. 12 is a schematic of the end detail of one frame.

FIG. 10 show the construction of inlet openings 22 in which two flat parallel and spaced side strips 31 form continuations of the sides of the frame 1, so that the openings 22 are formed between them. The end portions of the baffle strips 30 are integrally molded with the side strips 31. Each of the side strips 31 is provided with a rib 32 extending along its length and which fits into a flute 33, see FIGS. 11 and 12 formed in the opposed side face of the neighboring frame 21. The foil 35 is trapped at its edges between the ribs 32 and the flutes 33, which hold these edges firmly in place when the heat exchanger stack in FIG. 9 is assembled.

Figure 13:
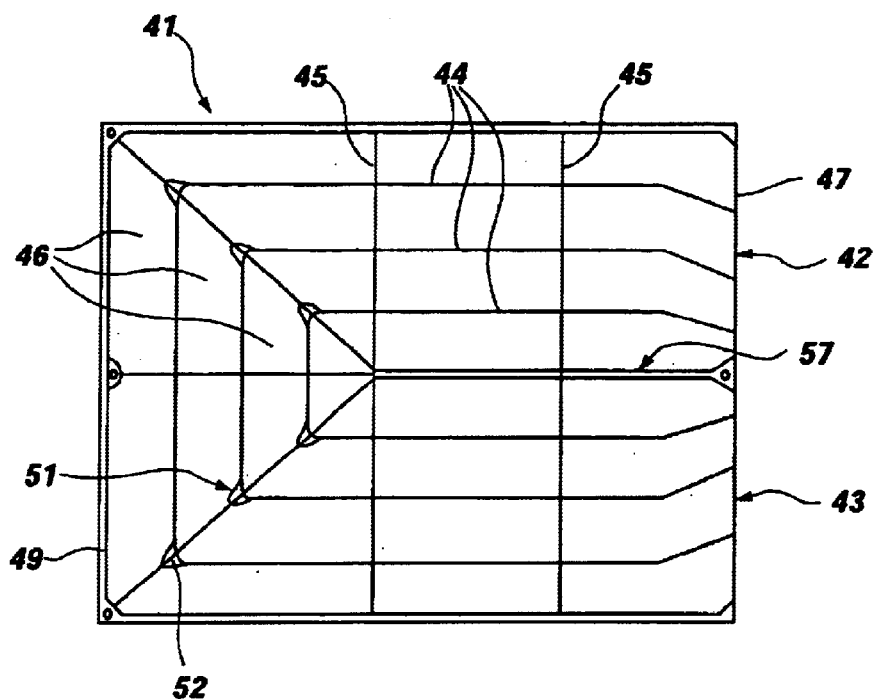
FIG. 13 is a plan view of a third embodiment of a removable frame having baffles defining the platen of passageways of a heat exchanger in accordance with the present invention.

FIG. 13 shows a third embodiment of a frame 41, which is substantially counterflow in operation. FIG. 8 is very similar to the first embodiment in FIG. 1. It differs by having a dividing strip 56 separating the inlet and outlet openings 42 and 43. The strip 57 may be half the length of frame 41 or longer. The frame 41 has inlet opening 42 and outlet opening 43 comprising a multiple set of thin guiding strips 44 which together define passageways 46 extending between inlet opening 42 on the upper side and outlet opening 43 on the lower side of frame 41. The webs 45 are of thin rectangular cross section and extend edgeways across frame 41, to act as turbulent triggers to the gas flow to enhance the performance and to support the guiding strips 45. The thin web 47 extends edgeways across the openings 42 and 43 and supports strips 44. The solid edge strip 49 supports the frame on three sides. Openings 42 vary in size to allow the same amount of air to be drawn into each passage 46. By varying the sizes of the inlet openings 42, 43 the pressure and flow of gas passing through each passageway 46 is controlled, to be approximately equal and have the same "dwell time." The extending knobs 51 at the turning areas of each passageway 46, although not essential, may preferably allow the gas to slow down and use more area of the corner. The rebates (or holes) 52 are used to drain any water that condenses in the frame 41.

Figure 14:
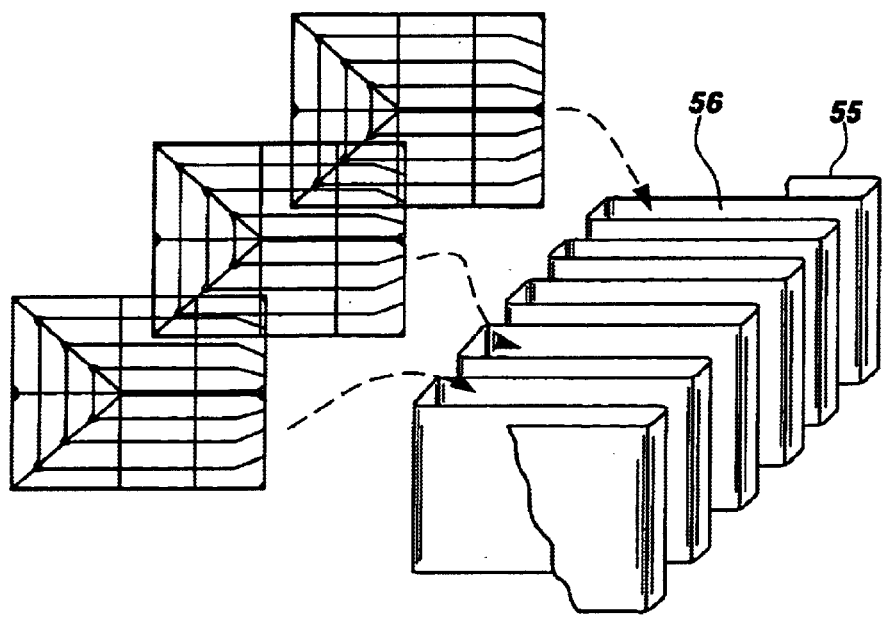
FIG. 14 is a perspective and exploded view of part of a heat exchanger using the removable frame shown in FIG. 11.

FIG. 14 shows a perspective and exploded schematic view of part of the gas heat exchanger of the third embodiment. The plastic frame 41 is inserted into each of the pockets 56 where every alternate frame 41 is turned through 180 degrees to allow the flow of gas to both sides of the stack.

The sinuously wound foil 55 is in a similar configuration and material to that of foil 15 of the first embodiment.

The heat exchanger described in abovementioned embodiments is suitable for use in a number of air-conditioning or ventilation systems that exchange sensible and latent heat of outdoor air. The heat exchanger can be used in an air-conditioning system supplying outdoor air into the return air of an existing heating and or cooling plant, or just installed separately to service outdoor air into a room. The Total Heat Air Exchanger can be incorporated into a Fan Coil Unit for supplying 10% to 100% of outdoor air with the transfer of energy from the exhaust air. The latent transfer may be around three times more energy transfer as compared to a prior art sensible transfer heat exchanger.

A number of applications will now be described utilizing the abovementioned second embodiment of a heat exchanger.

Figure 15:
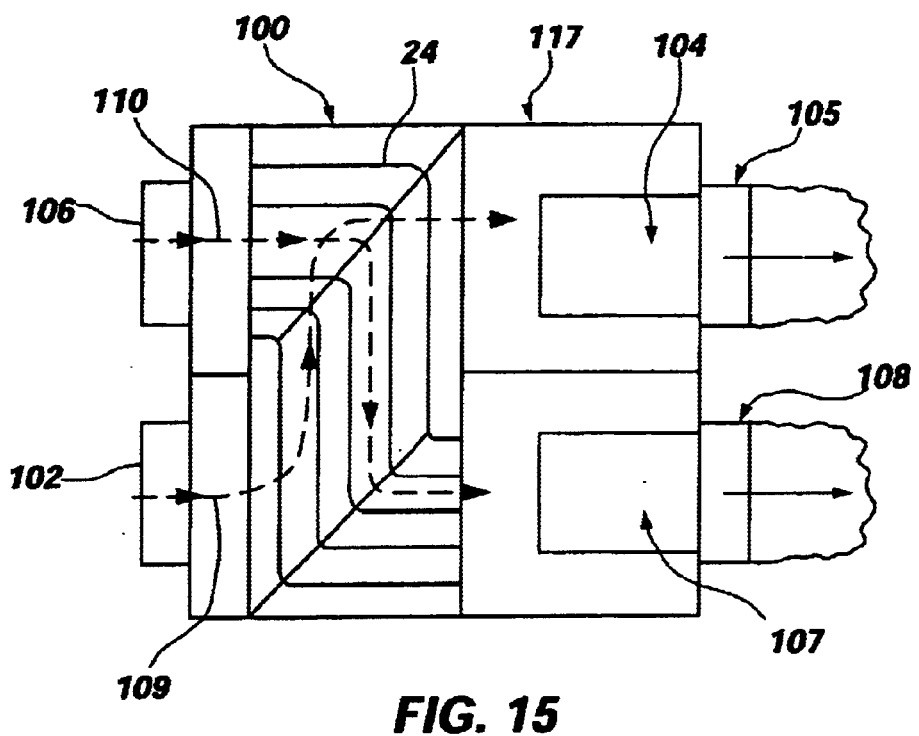
FIG. 15 is a schematic side elevation of a first arrangement of an air make-up unit.

FIG. 15 shows an air make-up unit having a casing 117 for supply of outdoor air 102 through enthalpy heat exchanger 100 to supply fan 104 to opening 105 which leads to a delivery conduit for delivery to a space being air-conditioned. Heat exchanger 100 is of the type described in the abovementioned second embodiment of a heat exchanger described with reference to FIGS. 6–9. The exhaust (or stale) air 106 from the space being air-conditioned passes through heat exchanger 100 via exhaust fan 107 and exhausted to atmosphere through outlet 108.

Heat Exchanger 100 provides two mutually isolated substantially counterflow gas circuits 109 and 110 between which good heat exchange properties exist. Baffles 24 guide the air flowing through the heat exchanger 100 to travel along paths which are substantially in counterflow to one another to maximize the sensible and latent heat transfer between the arrowed primary circuit 109 along which the fresh air 102 to be cooled or heated is passed, and the arrowed secondary circuit 110 through which the exhaust air 106 travels. In this arrangement the fresh air 102 and exhaust air 106 arrive on the same side of Heat Exchanger 100 and discharge at opening 105 and outlet 108 on the same side.

Figure 16:
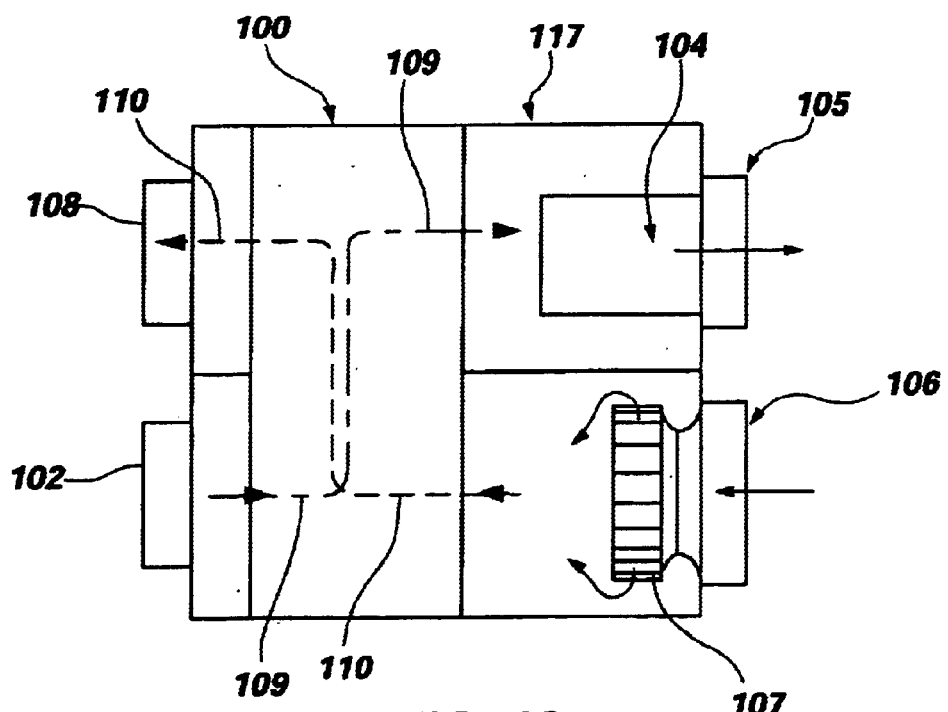
FIG. 16 is a schematic side elevation of a second arrangement of an air make-up unit.

In an alternative arrangement as shown in FIG. 16, the air streams are opposite to one another. The performance is very similar but some installations may require the arrangement of FIG. 16 rather than that shown in FIG. 15.

Figure 17:
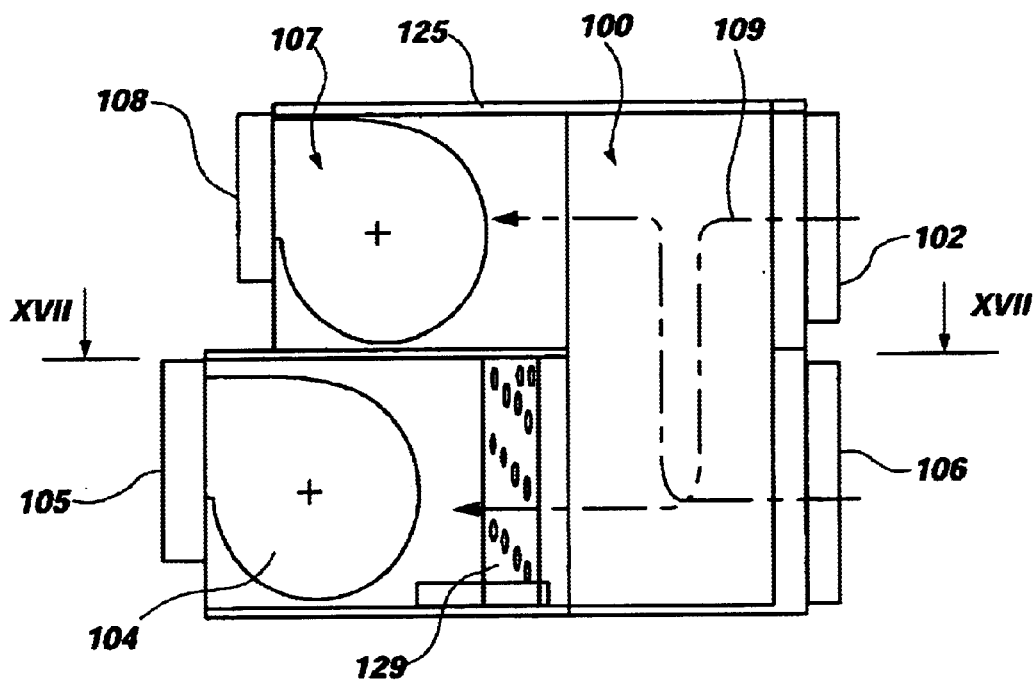
FIG. 17 shows a schematic elevation of a third arrangement of an air make-up unit in the form of a fresh air fan coil unit with an evaporative coil.
Figure 18:
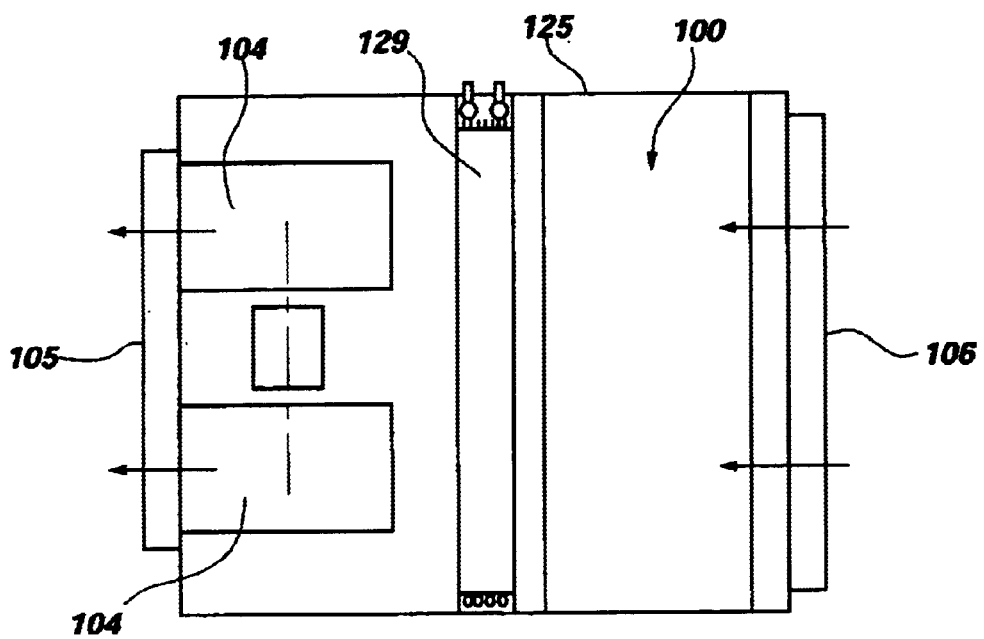
FIG. 18 is a sectional view through XVII—XVII of the air make-up unit shown in FIG. 17.

FIGS. 17 and 18 shows a "fresh air fan coil unit" (or air conditioning unit) having a casing 125 of apparatus for supplying outdoor air 102 through primary circuit 109 to evaporator coil 129 to supply fan 104 through to outlet 105. The exhaust air stream 106 from the room travels through the secondary circuit 109 of heat exchanger 100 to the exhaust fan 107 to opening 108. It is intended that this arrangement handle up to 100% outdoor air with a near balanced air stream of 100% exhaust air through the Heat Exchanger. It is mainly used commercially when total fresh air is needed, such as smoking bars, cinemas, hospitals or anywhere where there are a lot of people or contaminated air in an enclosed space. The coil 129 can be a chilled water coil, a vapor compression evaporator or a hot water coil and can be a mixture of the above. Typical air flows may range from 300 l/s supply and exhaust air to 10,000 l/s. As it is necessary to have a positive pressure in the room, the supply air is normally 5% to 10% more air than the exhaust air stream. Filtering of the air streams is normally done at the point of entry of the air streams, (not shown on the drawings). The enthalpy heat exchanger 100 transfers around 3 times more energy than a sensible heat exchanger thus dropping the temperature and humidity by approximately 75% from the exhaust air stream.

Figure 19:
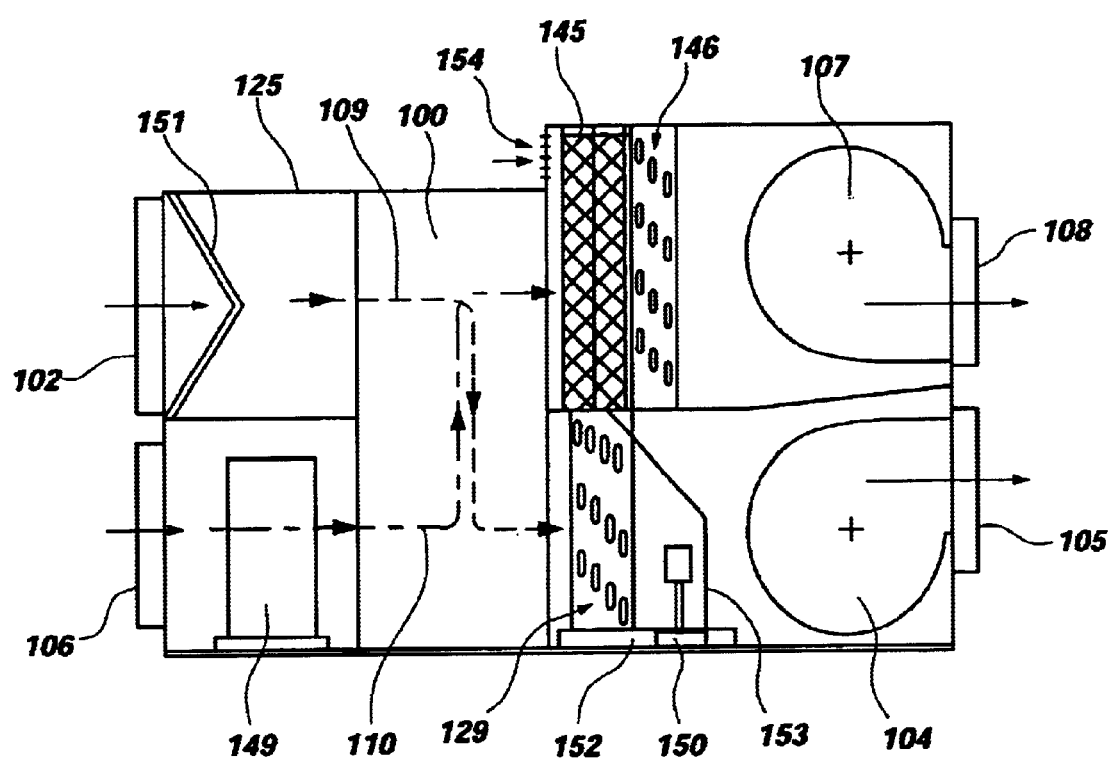
FIG. 19 shows a schematic elevation of a fourth arrangement of an air make-up unit in the form of a fresh air packaged unit with an evaporative coil, cooling pad and condenser coil.

FIG. 19 shows an air conditioning apparatus similar to that described in FIGS. 17 and 18, but also incorporates an evaporative cooling pad 145. The heat exchanger 100 is housed in casing 125 for supplying outdoor air 102 through air filters 151 into primary circuit 109 of heat exchanger 100. It then flows into evaporator coil 129 to supply fan 104 to outlet 105 to be delivered to the room. The exhaust from the room enters compressor 149 and the secondary circuit 110 of heat exchanger 100 via opening 106 and travels to the evaporative cooling pad 145 where it is cooled to almost wet bulb temperature from the condensed water of the evaporator coil 129, and pumped by pump 150 in tray 152 through pipe 153 to the top of the cooling pad 145. The exhaust air stream then enters the condenser coil 146 together with make up air 154 to exhaust fan 107 to outlet 108 to atmosphere.

The overall efficiency of the vapor compression system is increased by use of the evaporative cooling pad 145, but can work without it if costs are a factor. The system is ideally suited for reverse cycle heating or can use gas heating (not shown). The system performance on cooling at an ambient of say 35° C. dry bulb and 28° C. wet bulb with a return room temperature of 25° C./18° C. using the heat exchanger 100 and the evaporative cooling pad 145 into the hot condenser coil would have a Coefficient of Performance (COP) for unit of over 5:1, compared to the average unit with a COP of 2.3:1.

In this case the enthalpy heat exchanger 100 does more than 50% of the total energy needed to cool and dehumidify the ambient air to the supply temperature needed to cool the room.

Figure 20:
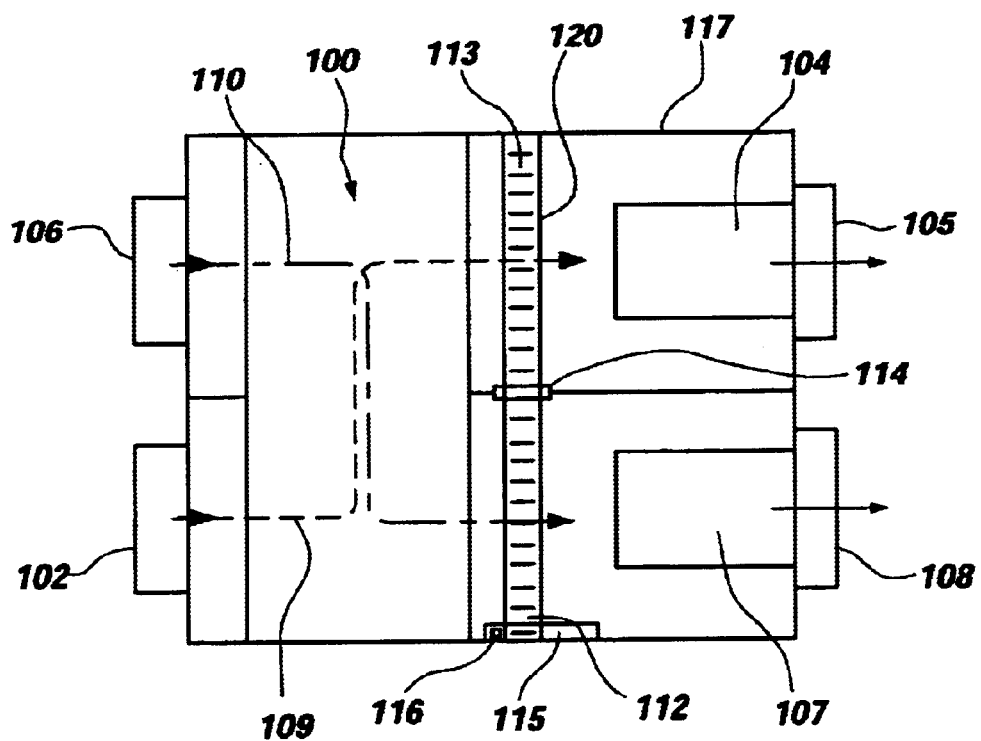
FIG. 20 shows a schematic elevation of a fifth arrangement of an air make-up unit in the form of a fresh air fan coil unit with thermoelectric panel.

FIG. 20 shows an air make-up unit similar to the one shown in FIG. 15, but also incorporates a thermo-electric (semiconductor) heating and cooling panel 120. The air make-up unit has a casing 117 to supply outdoor air 102 through enthalpy heat exchanger 100 to a first finned heat sink portion 113 of thermo-electric panel 120 to the supply fan 104 to opening 105. The exhaust air 106 transfers to heat exchanger 100 to a second finned heat sink portion 112 of the thermoelectric panel 120 to exhaust fan 107 and exhausted to atmosphere through outlet 108. A control module 114 divides the first and second finned heat sink portions, 112 and 113. A drain tray 115 removes any water condensed out of the atmosphere and is drained away by drain 116. This type of unit is suitable for ducting into one or more rooms, such as a house, office or hotel room, because it can be made as a low profile unit. The Enthalpy Heat Exchanger 100 provides two mutually isolated substantially counterflow gas circuits 109 and 110 between which good heat exchange properties exist. Gas flows through the heat exchanger 100 along paths which are substantially in counterflow to one another to maximize the sensible and latent heat transfer between the arrowed primary circuit 109 along which the fresh air to be cooled or heated is passed, and the arrowed secondary circuit 110 through which the exhaust (or stale air) travels. The application of a DC voltage to control module 114 induces either a heating mode or a cooling mode depending on the polarity of the voltage.

Figure 21:
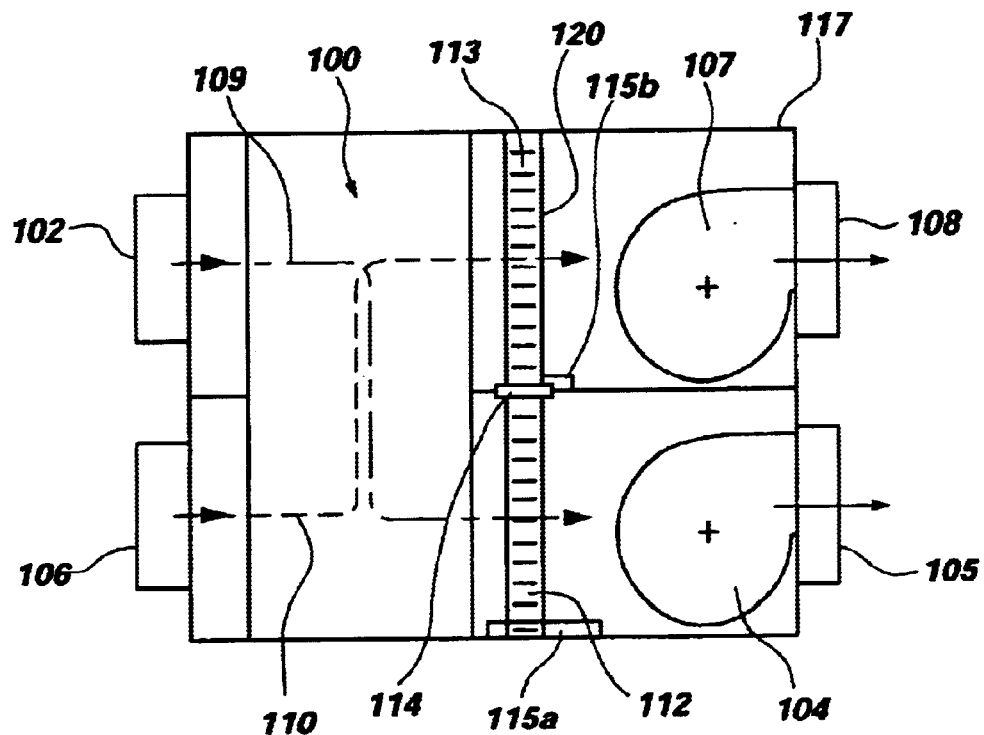
FIG. 21 shows a schematic elevation of a sixth arrangement of an air make-up unit in the form of a fresh air fan coil unit with thermo-electric panel.

FIG. 21 is similar to FIG. 20 except the heat exchanger 100 is in the vertical position and can be any suitable length to allow for higher heat loads and air flows. The casing 117 of apparatus to supply outdoor air 102 through circuit 109 of the enthalpy heat exchanger 100 to the first portion 112 of the thermoelectric panel 120 to the supply fan 104 to opening 105. The exhaust air 106 passes through circuit 110 of heat exchanger 100 to the exhaust side of the second portion 113 of the thermo-electric panel 120 to exhaust fan 107, then exhausted to atmosphere through outlet 108. As in FIG. 20 the control module 114 divides the first and second finned heat sink portions, 112 and 113. The drain trays 115a and 115b remove any water condensed out of the atmosphere.

Figure 22:
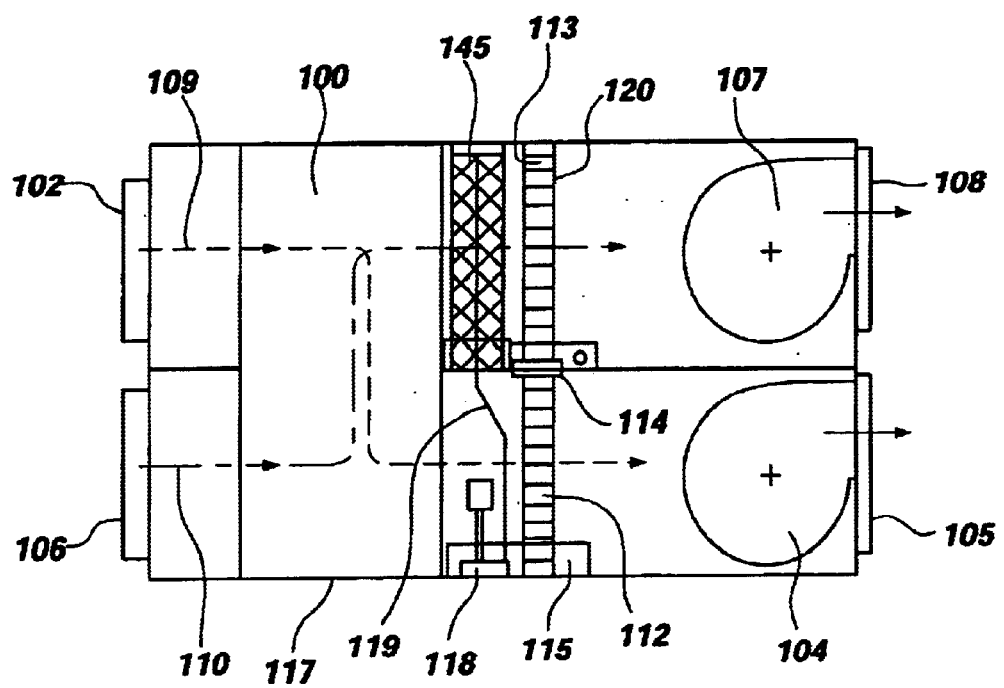
FIG. 22 shows a schematic elevation of a seventh arrangement of an air make-up unit in the form of a fresh air packaged unit with thermo-electric panel and cooling pad.

FIG. 22 is the same as FIG. 21, except an evaporative cooling pad 145 is installed before the exhaust air 106 enters the second portion 113 of the thermoelectric panel 120, thus being exhausted to atmosphere via fan 107 to opening 108. The condensed water from first a portion 112 of the thermoelectric panel 120, is pumped via pump 118 out of drain tray 115 via supply pipe 119 to the cooling pad 145, thus increasing the cooling performance of the thermo-electric panel 120. This lowers the supply temperature and lowers the input current. Control module 114 divides the first and second finned heat sink portions, 112 and 113.

Figure 23:
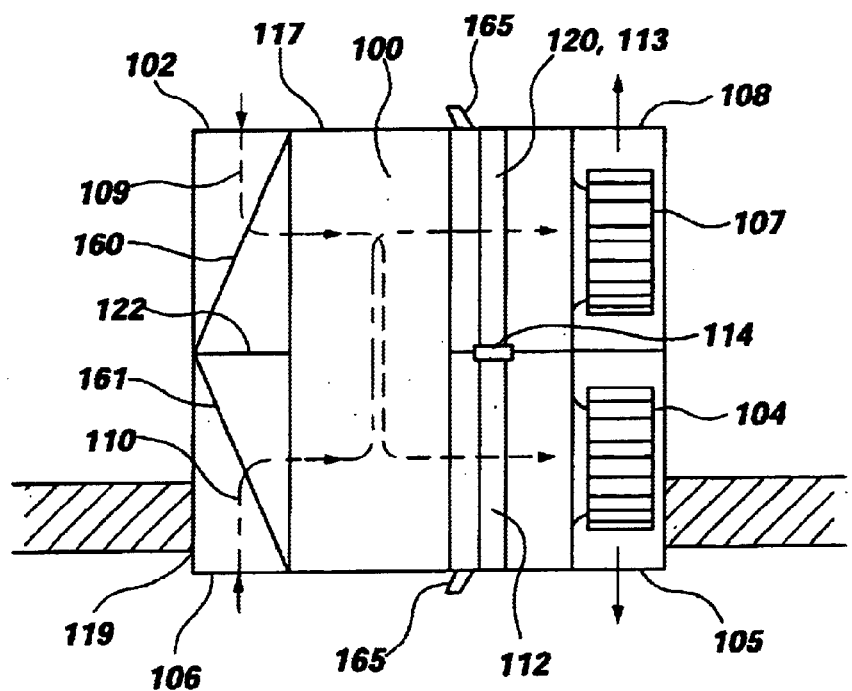
FIG. 23 shows a schematic plan of a eighth arrangement of an air make-up unit in the form of a fresh air fan coil unit with thermoelectric panel.

FIG. 23 is similar to FIG. 20, except the supply fan 104 and exhaust fan 107 are turned at right angles. The casing 117 where supply outdoor air 102 enters through air filter 160 into enthalpy heat exchanger 100 of circuit 109 to a first finned heat sink portion 112 of thermo-electric panel 120, to the supply fan 104 to enter the room through opening 105. The exhaust air 106 enters through air filter 161 into heat exchanger 100 via circuit 110 to exhaust fan 107 to opening 108 to atmosphere. If total fresh air is not needed the bypass openings 165 can supply extra air for the first and second finned heat sink portions, 112 and 113.

Divider panel 122 separates the indoor and outdoor air streams 102 and 106. The unit may be fixed into a wall opening 119 or an open window.

The thermo-electric panel 120 is a semiconductor based electronic component that functions as a solid-state heat pump. The elements of the semi conductor material are connected electrically in series and thermally in parallel. It is also known as the "Peltier effect" when used in thermoelectric refrigeration. When DC voltage is applied to control module 114, positive and negative, P-n couple, charged carriers absorb heat energy on one module face. Emission or absorption of heat occurs when direct current passes through a junction of two different conductors.

The advantage of utilizing the thermoelectric panel 120 in air make-up units as shown in FIGS. 20–23 is that they have few moving parts, compared to a conventional compressor driven system, have no polluting refrigeration gases, a low starting current and up to 100% change of outdoor air. Because of the low DC starting current it can also be used with PV electric cells.

As these air-make up units have no compressor, noise and vibration is very low. The change from cooling to heating mode is simply done by reversing the polarity of the electric circuit. The isolating heat exchanger cools and dehumidifies the outdoor air in summer by exchanging the enthalpy of the cool exhausting air on the cooling cycle. The heating mode warms the cold outdoor air and transfers the exhausting moisture back into the incoming air. The thermoelectric panel 120 heats or cools as required and can vary the current to hold a comfortable temperature.

The efficiency can be increased in the cooling mode by using the evaporated water from the air cooling fins and pumping it over an evaporative pad or spraying the hot fins of the exhausting air of the semi conductor panel.

The system can be fitted into a window opening or wall or in a ceiling void or under a floor. The system is ideal for hotel rooms, high-rise buildings for large ducted areas or just one room. For hotel rooms the low profile fresh air thermo-electric panel unit can be fitted above the bathroom ceiling void with a small fresh air duct installed against the ceiling to the outside.

The isolating heat exchanger transfers the energy of the outside air to the exhaust air. The fresh supply air is then cooled or heated as required by the first portion 112 of the thermo-electric panel. The bathroom exhaust air 106 passes through the second portion 113 of the thermoelectric panel 120 via heat exchanger 100 and then exhausted into the bathroom exhaust system to atmosphere. The unit can be small in size, easy to install, quiet and has a low start current, which lowers the electrical impact of the building. Every room is then independent of each other, and can be individually adjusted for airflow and comfort. The incoming fresh air far exceeds the fresh air requirements for a hotel room and the bathroom exhaust air volume is also exceeded with no impact on the running costs of the hotel room.

Figure 24:
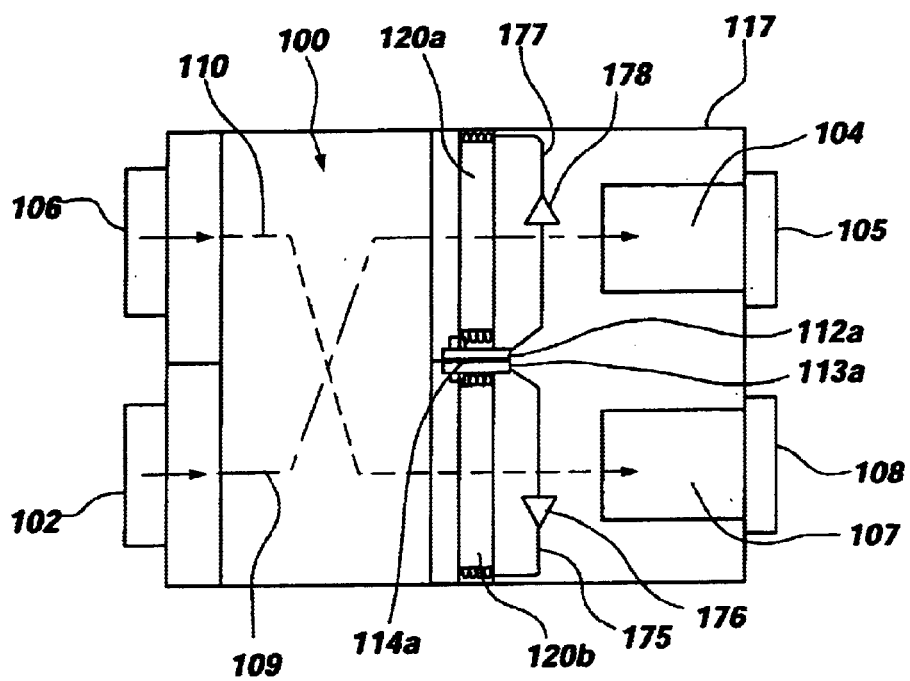
FIG. 24 shows a schematic plan of a ninth arrangement of an air make-up unit in the form of a fresh air fan coil unit with a water-jacket/water coil assembly.
Figure 25:
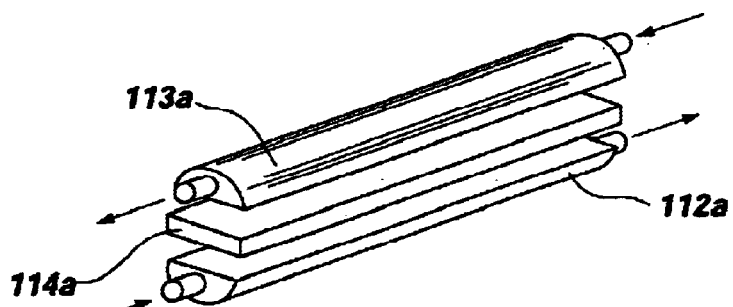
FIG. 25 shows an enlarged exploded perspective view of a water jacket/control module assembly used in the air make up unit of FIG. 24.

FIG. 24 shows a variation of the air make-up unit FIG. 20 having first and second water-coils 120a and 120b instead of panel 120, and has water jackets 112a and 113a fitted to control module 114a (FIG. 25). A first water circuit 175 with pump 176 circulates water to first water-coil 120a. Outside supply air 102 enters heat exchanger 100 and travels past water coil 120a and water jacket 112a through to supply fan 104 and opening 105. A second water circuit 177 with pump 178 circulates water to second water-coil 120b. The exhaust air 106 transfers to heat exchanger 100 to second water coil 120b and water jacket 113a to exhaust fan 107 and exhausted to atmosphere through outlet 108. The control module 114a divides the first and second water jackets 112a and 113a to allow water to flow there through in a counterflow arrangement. In this way the module 114a can be situated away from the air stream or the casing 117, and connected by the water circuits 175 and 177 with pumps 176 and 178 respectively, to cool or heat the two separate air streams via heat exchanger 100. FIG. 25 depicts the assembly water jackets 112a, 113a/control module 114a assembly.

The air make-up units as shown in FIGS. 20–24 can also be used to cool vehicles such as cars, buses, trains and military vehicles.

Figure 26:
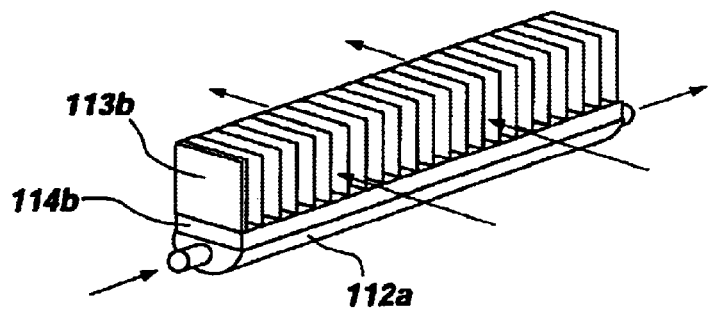
FIG. 26 shows an enlarged perspective view of a water jacket-finned heat sink/control module assembly used in the air make up unit of FIG. 24.

FIG. 26 shows an alternative embodiment to the module 114a shown in FIG. 21, the control module 114b may have a water jacket 112a fitted to one side and a plurality of air cooling fins 113b fitted to the other side. In this way the module 114b can be situated away from the air stream or the casing 117.

In a further arrangement, the heat exchanger of the present invention is also suitable for maintaining a fresh air environment in cold storage rooms containing food products, such as fruits, vegetables, meats, dough, and any other types of foods that require uncontaminated air to hold their freshness and to be stored for long periods. This arrangement utilizing the invention will be described with reference to FIGS. 27 and 28 and is particularly concerned with the removal of undesirable gases from the room, in which those products being stored release unwanted gases. The embodiment is particularly suitable, although not exclusively, with commercial fruit storage rooms.

Figure 27:
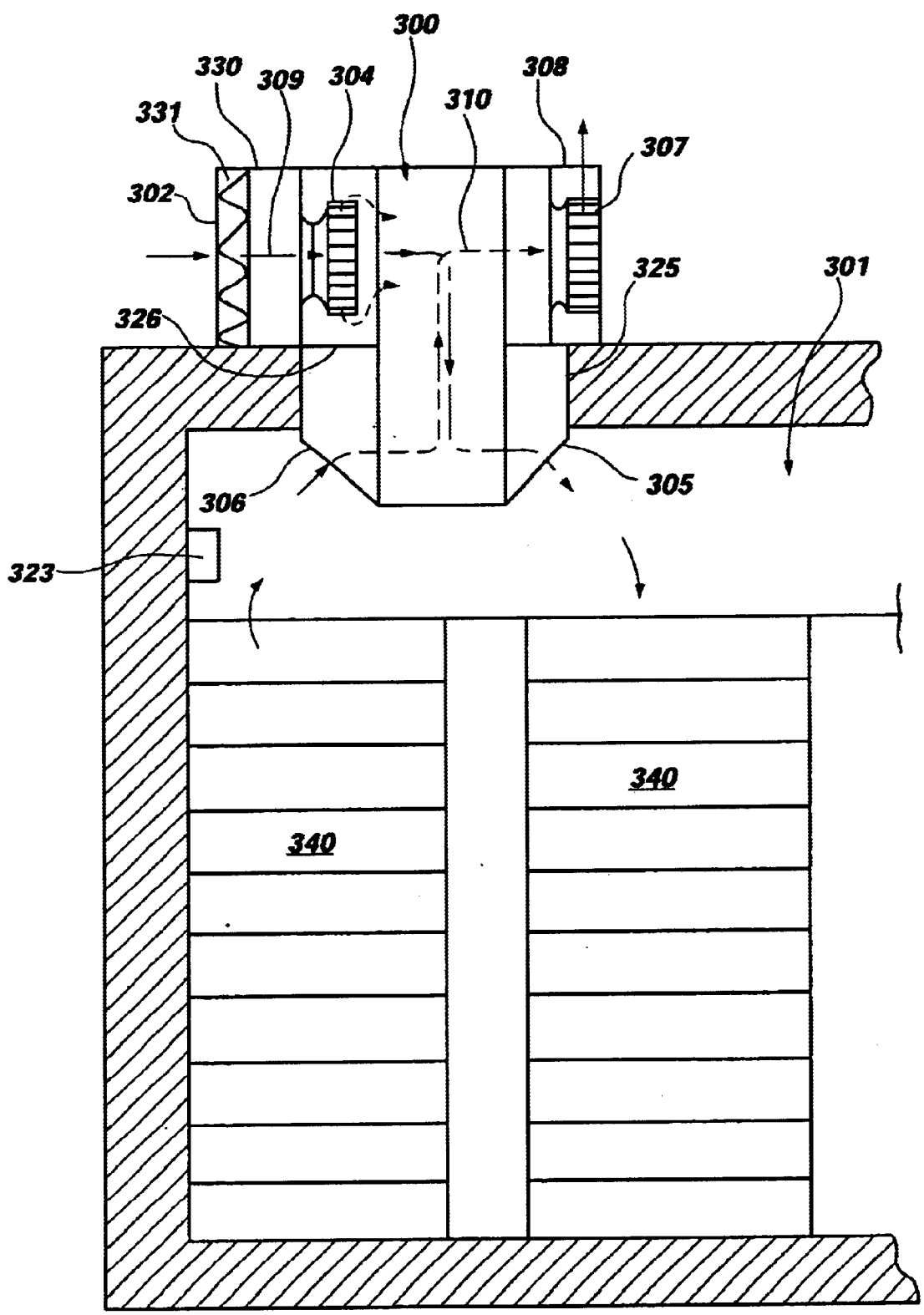
FIG. 27 is a schematic side elevation of a first arrangement of a ventilation unit for a cold storage room.

FIG. 27 depicts a partial schematic view of fruit storage room 301 and contains a stack of fruit boxes 340 and is provided with a service door (not shown) through which the boxes may individually be transferred to and from the room. Installed approximately in the center of the storeroom ceiling is an opening 325 divided by a baffle 326 into an air inlet duct 302 and air outlet duct 305. The opening 325 is covered inside and outside the storeroom by a casing 330. An air filter screen 331 filters the incoming fresh air.

The casing 330 contains two gas flow passages 309 and 310 denoted, respectively by broken and full arrows. The flow passage 309 extends from the air inlet duct 302 to a fresh air vent 305 in the casing 330 and the gas flow passage 310 extends from a gas extraction vent 306 to the air outlet duct 308 to atmosphere.

The casing 330 contains a substantially counterflow high efficiency gas heat exchanger 300 of the isolating type, such as is described in the abovementioned second embodiment of a heat exchanger described with reference to FIGS. 6–9 in the earlier described second embodiment of the heat exchanger. The heat exchanger 300 contains two isolated gas flow paths of large cross-sectional area through which air is passed by respective motor driven impellers 304 and 307 in the upper region of the casing 330. Impeller 304 produces the same or slightly greater air volume across it as fan impeller 307, so that the air pressure in the storeroom 301 is maintained at substantially the same level or slightly greater as the outside air.

The fresh air is cooled by the exhaust (stale) air leaving the storeroom through the passage 310 to be cooled beneath its dew point, and close to the room temperature.

The store room may be provided with its own air temperature control plant 323 for maintaining the humidity and temperature of the air within it at their optimum values to suit the particular fruit being stored. The refrigeration plant may, if desired, be incorporated into the casing 330.

The unit can also be wired to run continuously or wired into the main refrigeration system to run at the same time.

When the apparatus is in use, the fan impellers 304 and 307, continuously force air through the gas flow passages 309, 310. Because of the operating characteristics of the fan impellers, the air pressure in the storeroom is held at slightly higher than that prevailing outside, so that when the servicing door (not shown) is temporarily open, there is no flow of outside air into the store room. This ensures there is little loss of heat from the storeroom by way of the open door.

The stale air containing unwanted gases such as ethylene is continuously removed from the storeroom via passage 310 and replaced by fresh filtered air in passage 309 and cooled to the temperature prevailing in the storeroom by the outgoing stale air. Thus there is no build-up of the unwanted gases in the storeroom and only a very little loss of heat occurs as a result of the removal of stale air from the store room.

The power used by the fan motors is small being less than two hundred watts when the rate of air replacement in the store room is two hundred and fifty litres per second, so that the operating heat produced by the fan motor which has been designed to be outside the store room has virtually no effect on the temperature prevailing inside the storeroom.

Figure 28:
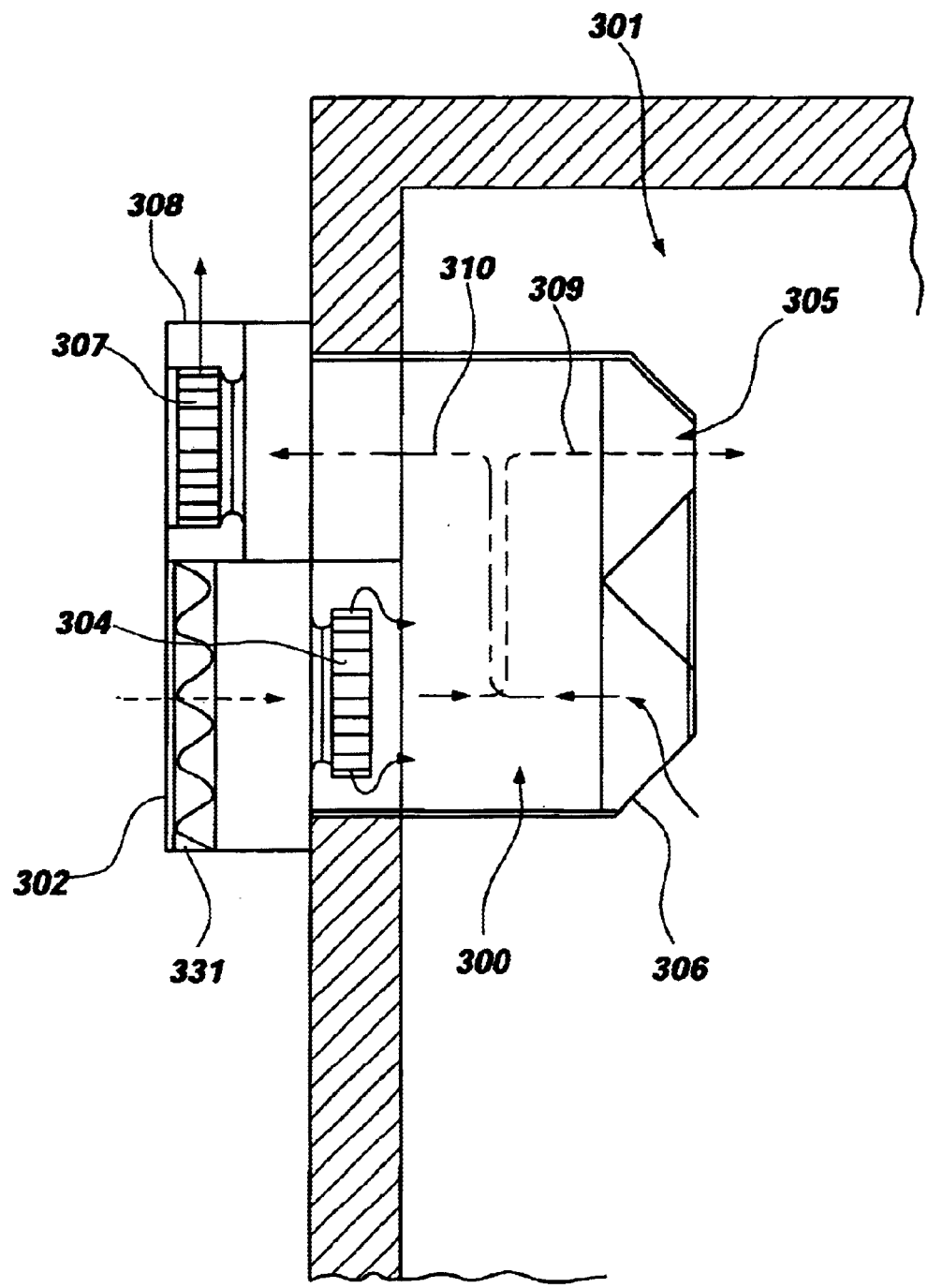
FIG. 28 is a schematic side elevation of a second arrangement of a ventilation unit for a cold storage room.

FIG. 28 shows an alternative embodiment of the system shown in FIG. 27, designed to fit in to the wall of the storage room 301. The outside ambient air enters the air filter screen 331 to the inlet duct 302 then flows into the heat exchanger 300 by the impeller 304. It follows the circuit passageway 309 to air outlet duct 305. The exhaust stream enters at gas extraction vent 306 to heat exchanger 300 via circuit passageway 310 to impeller 307 to outlet 308 to atmosphere.

FIG. 28 can also be fitted inside the roof area but has the disadvantage of protruding into the ceiling more than does the embodiment of FIG. 27 which could be a problem for forklifts loading and unloading produce, By using the Enthalpy Heat Exchanger that transfers sensible and latent heat, the apparatus has the advantage of not needing a drain.

The unit can also be wired to run continuously or wired into the main refrigeration system to run at t he same time.

The power used by the fan motors is small being less than two hundred watts when the rate of air replacement in the store room is two hundred and fifty litres per second, so that the operating heat produced by the fan motor which has been designed to be outside the coolroom has virtually no effect on the temperature prevailing inside the storeroom.

As the arrangement does not involve re-circulation of the air in the room, the use of a scrubbing apparatus and the attendant costs are avoided. Thus only small heat losses are incurred by the operation of the apparatus and it operates with an improved performance and a higher overall efficiency than the previously used scrubbing apparatus.

Although the use of the invention in this embodiment is described in conjunction with a fruit store room, the invention is equally usable in any situation where it is desired to maintain the atmospheric conditions in a confined space while achieving economies in capital and running costs. Such confined spaces may comprise, for example, storage rooms or compartments for fish or meat which both require the maintenance of a certain humidity and constant low temperature in order to reduce the incidence of drying out or spoiling of the stored produce. Due to no drain being required, the apparatus is also ideally suited to ventilate shipping containers used to transport produce or food products, or other products that need air ventilation because of contaminated air. The unit could also be used in vehicles used to transport food in cold storage compartments.

In another embodiment the invention comprises the heat exchanger described in U.S. Pat. No. 5,829,513, but utilizing a moisture permeable material for the heat conductive material foil. As with the earlier described embodiments the moisture permeable material may be a fine woven plastic material or paper with a high water strength texture than can transfer both sensible and latent heat. One suitable type of paper is kraft paper weighing about 45 grams per square meter, which has been described earlier.

Although the invention has been described with reference to specific examples, it will be appreciated by those skilled in the art that the invention may be embodied in many other forms.

What is claimed is:

1. A gas-flow heat exchanger comprising a set of parallel, spaced, heat-conductive areas providing between them a stack of pockets each containing parallel baffles which define a platen of passageways guiding the gas-flow path through the pocket between inlet and outlet openings, the openings being arranged in four parallel lines at the sides of the stack, two of the lines respectively containing the inlet and outlet openings associated with the gas flow paths of alternative pockets of the stack, while the remaining two lines respectively containing the inlet and outlet openings associated with the remaining pockets of the stack of the heat exchanger, each pocket containing a frame formed with the openings provided at the ends of the gas flow path through it and supporting within the frame the parallel baffles which divide the gas-flow path into the platen of passageways, and wherein said passageways provide a substantially equal dwell time to gas passing therethrough.

2. A gas-flow heat exchanger as claimed in claim 1, wherein each of said passageways has a substantially equal length.

3. A gas flow heat exchanger as claimed in claims 1 or 2, wherein the baffles define substantially S or Z- shaped platen of passageways.

4. A gas flow heat exchanger as claimed in claim 1, wherein the platen of passageways of one of said pockets is the mirror image of the platen of passageways of an adjacent pocket to provide crossover counterflow.

5. A gas flow heat exchanger as claimed in claim 1 wherein the inlet opening of each passageway is on an opposite side of the stack to that of its associated outlet opening.

6. A gas-flow heat exchanger as claimed in claim 1, wherein each platen of passageways is a nest of substantially U-shaped passageways.

7. A gas-flow heat exchanger as claimed in claim 6, wherein the length of one of said U-shaped passageways is greater in length than that of an adjacent U-shaped passageway inwardly nested thereto.

8. A gas-flow heat exchanger as claimed in claims 6 or 7, wherein the inlet opening and outlet opening of one of said U-shaped passageways is larger in size to the inlet opening and outlet opening of an adjacent U-shaped passageway inwardly nested thereto.

9. A gas-flow heat exchanger as claimed in claim 7, wherein each successive U-shaped passageway has a larger inlet and outlet openings than a passageway inwardly nested thereto.

10. A gas-flow heat exchanger as claimed in claim 1, wherein each of the pockets contains an identical structure of frame and baffles, differently oriented so that the opening associated with alternative pockets lie in two lines, and the openings associated with the remaining pockets lie in two different lines.

11. A gas-flow heat exchanger as claimed in claim 1, wherein the parallel heat-conductive areas separating the pockets from one another are formed from spaced rectangular or square areas of a sinuously wound heat conductive material.

12. A gas-flow heat exchanger as claimed in claim 11, wherein said heat conductive material is selected from the group consisting of a metal foil and thin plastic foil.

13. A gas-flow heat exchanger as claimed in claim 11, wherein said heat conductive material is a moisture permeable material that can transfer both sensible heat and latent heat.

14. A gas-flow heat exchanger as claimed in claim 13, wherein said moisture permeable material is paper.

15. A gas-flow heat exchanger as claimed in claim 14, wherein said paper has a high water strength texture.

16. A gas-flow heat exchanger as claimed in claim 15, wherein said paper is kraft paper.

17. A gas-flow heat exchanger as claimed in claim 16, wherein said kraft paper weighs about 45 grams per square meter.

18. A gas-flow heat exchanger as claimed in claim 13, wherein said moisture permeable material is a finely woven plastic material.

19. A gas-flow heat exchanger as claimed in claim 1, wherein the combination of frame and baffles is provided by a skeletal structure.

20. A gas-flow heat exchanger as claimed in claim 19, wherein said skeletal structure is plastic.

21. An air conditioning system utilizing a gas-flow heat exchanger as claimed in claim 1, wherein an air supply fan is in fluid communication with one of the lines containing inlet openings at the side of the stack to deliver air thereto, and an exhaust fan is in fluid communication with another of the lines containing inlet openings at the side of the stack to deliver exhaust air from the space being air-conditioned.

22. An air conditioning system as claimed in claim 21, wherein the supply fan and the exhaust fan are adjacent to each other on the same side of the stack.

23. An air conditioning system as claimed in clam 21, wherein the supply fan and the exhaust fan are on opposite sides of the stack.

24. An air conditioning system as claimed in claim 21, wherein air having entered the gas-flow heat exchanger through the action of the air supply fan, leaves the gas-flow heat exchanger and passes through an evaporator coil prior to entering a delivery conduit for delivery to the space being air-conditioned.

25. An air conditioning system as claimed in claim 24, wherein said evaporator coil is selected from the group consisting of a chilled water coil, a vapor compression evaporator and a hot water coil.

26. An air conditioning system as claimed in claims 24 or 25, wherein exhaust air having entered the gas-flow heat exchanger through action of the exhaust fan, leaves the gas-flow heat exchanger and passes through an evaporator pad where it is cooled by water to almost wet bulb temperature.

27. An air conditioning system as claimed in claim 21, wherein a thermo-electric panel is placed in fluid communication with the lines containing outlet openings at the side of the stack, with a first portion of said thermo-electric panel in fluid communication with one of the lines containing outlet openings at the side of the stack associated with gas-flow paths of alternate pockets of the stack, and a second portion of said thermoelectric panel is in fluid communication with one of the lines containing outlet openings at the side of the stack associated with gas-flow paths of the remaining pockets of the stack, and a control module is disposed between said first and second portions of thermo-electric panel.

28. An air conditioning system as claimed in claim 27, wherein said thermo-electric panel comprises hot and cold finned heat sinks.

29. An air conditioning system as claimed in claim 27 or 28, wherein the application of a DC voltage to said control module induces a heating mode or a cooling mode to said air conditioning system depending on the polarity of said voltage.

30. An air conditioning system as claimed in claim 21, wherein a water-jacket assembly is placed in fluid communication with the lines containing outlet openings at the side of the stack, with a first portion of said water jacket assembly comprising a first water coil fluidly connected to a first water jacket and a first pump and said first water coil adjacent with one of the lines containing outlet openings at the side of the stack associated with gas-flow paths of alternate pockets of the stack; and with a second portion of said water jacket assembly comprising a second water coil fluidly connected to a second water jacket and a second pump and said second water coil adjacent with one of the lines containing outlet openings at the side of the stack associated with gas-flow paths of the remaining pockets of the stack; and a control module is disposed between said first and second water jackets.

31. An air conditioning system as claimed in claim 30, wherein one of said first and second portions of said water jacket assembly is replaced by a set of air cooled fins adjacent to said control module.

32. A storage ventilator system for a cold room utilizing a gas-flow heat exchanger as claimed in claim 1, wherein fresh air entering said cold room passes through a first fan in fluid communication with one of the lines containing inlet openings at the side of the stack associated with gas-flow paths of alternate pockets of the stack; and exhaust air leaving said cold room passes through a second fan in fluid communication with one of the lines containing outlet openings at the side of the stack associated with gas-flow paths of the remaining pockets of the stack.

33. A storage ventilator system for a cold room as claimed in claim 32, wherein said first fan produces the same or slightly greater air volume across it as said second fan, thereby maintaining the air pressure within said cold room at substantially the same level or slightly greater as the outside air.

34. A storage ventilator system for a cold room as claimed in claims 32 or 33, wherein said first and second fans are impeller fans.

35. A gas-flow heat exchanger comprising a set of parallel, spaced, heat-conductive conductive areas providing between them a stack of pockets each containing parallel baffles which define a platen of passageways guiding the gas-flow path through the pocket between inlet and outlet openings, the openings being arranged in four parallel lines at the sides of the stack, two of the lines respectively containing the inlet and outlet openings associated with the gas flow paths of alternative pockets of the stack, while the remaining two lines respectively containing the inlet and outlet openings associated with the remaining pockets of the stack of the heat exchanger, each pocket containing a frame formed with the openings provided at the ends of the gas flow path through it and supporting within the frame the parallel baffles which divide the gas-flow path into the platen of passageways, wherein the parallel heat-conductive areas separating the pockets from one another is formed from spaced rectangular or square areas of a sinuously wound heat-conductive material characterized in that said heat-conductive material is moisture permeable material that can transfer both sensible heat and latent heat.

36. A gas-flow heat exchanger as claimed in claim 35, wherein said moisture permeable material is paper.

37. A gas-flow heat exchanger as claimed in claim 36, wherein said paper has a high water strength texture.

38. A gas-flow heat exchanger as claimed in claim 37, wherein said paper is kraft paper.

39. A gas-flow heat exchanger as claimed in claim 38, wherein said kraft paper weighs about 45 grams per square meter.

40. A gas-flow heat exchanger as claimed in claim 35, wherein said moisture permeable material is a finely woven plastic material.

41. A gas-flow heat exchanger as claimed in claim 35 or 40, wherein said gas-flow heat exchanger is of the type claimed in claim 1.

42. A gas-flow heat exchanger as claimed in claim 41, wherein said combination of frame and baffles is provided by a skeletal structure.

43. A gas-flow heat exchanger as claimed in claim 42, wherein said skeletal structure is plastic.

* * * * *